(12) United States Patent
Malrat et al.

(10) Patent No.: US 10,018,893 B2
(45) Date of Patent: Jul. 10, 2018

(54) METHOD FOR CALIBRATING A SIGHTING SYSTEM

(71) Applicant: MORPHO, Issy les Moulineaux (FR)

(72) Inventors: Benoit Malrat, Issy les Moulineaux (FR); Jean Beaudet, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days.

(21) Appl. No.: 14/931,571

(22) Filed: Nov. 3, 2015

(65) Prior Publication Data
US 2016/0124287 A1    May 5, 2016

(30) Foreign Application Priority Data

Nov. 5, 2014  (FR) ...................... 14 60691

(51) Int. Cl.
*H04N 5/225*  (2006.01)
*G03B 13/18*  (2006.01)
(Continued)

(52) U.S. Cl.
CPC ............ *G03B 13/18* (2013.01); *G01B 11/002* (2013.01); *G06T 7/80* (2017.01); *H04N 5/23293* (2013.01); *G06T 2207/30244* (2013.01)

(58) Field of Classification Search
CPC ......... G06T 7/001; G06T 7/0024; G06T 5/50; G06K 9/6201; G06K 9/6202; G06K 9/6215; H04N 1/442
See application file for complete search history.

(56) References Cited

U.S. PATENT DOCUMENTS

| 2002/0064382 A1* | 5/2002 | Hildreth ............. G06K 9/00375 396/100 |
| 2002/0094132 A1* | 7/2002 | Hoffman ................ G06T 15/20 382/276 |

(Continued)

OTHER PUBLICATIONS

French Search Report and Written Opinion, dated Jul. 30, 2015, French Application No. 1460691.

*Primary Examiner* — Twyler Lamb Haskins
*Assistant Examiner* — Dwight Alex C Tejano
(74) *Attorney, Agent, or Firm* — Womble Bond Dickinson (US) LLP

(57) ABSTRACT

The invention relates to a method for calibrating a sighting system comprising a viewfinder and an optic for detecting the position of an object in space, characterized in that it comprises the determination of a control law to apply to the viewfinder to aim at the object as a function of its position, said position being determined in a frame of reference of the detection optic and the control law comprising two angular controls and a focusing control of the viewfinder, expressed as a function of the relative positions between the object to aim at and an intersection point of all the lines of sight of the viewfinder,
the method comprising the steps consisting in:
aiming (100), with the viewfinder, at objects found at at least six different known positions in the frame of reference of the sighting system and noting the corresponding controls,
from the positions of the object and the corresponding controls, determining (200, 200') the position of the intersection point of the lines of sight and the control law by the minimization of a function of the second derivative of the control law.

10 Claims, 4 Drawing Sheets

(51) Int. Cl.
*G01B 11/00* (2006.01)
*H04N 5/232* (2006.01)
*G06T 7/80* (2017.01)

(56) References Cited

U.S. PATENT DOCUMENTS

| | | | | |
|---|---|---|---|---|
| 2003/0218607 | A1* | 11/2003 | Baumberg | G06T 7/0024 345/419 |
| 2003/0234866 | A1* | 12/2003 | Cutler | G06T 5/008 348/207.1 |
| 2004/0131248 | A1* | 7/2004 | Ito | G01C 11/06 382/154 |
| 2005/0261849 | A1* | 11/2005 | Kochi | H04N 5/217 702/85 |
| 2010/0289869 | A1 | 11/2010 | Chen et al. | |
| 2010/0322482 | A1* | 12/2010 | Kochi | G01C 11/06 382/106 |
| 2012/0062868 | A1* | 3/2012 | Kludas | G01C 11/025 356/4.01 |

* cited by examiner

METHOD FOR CALIBRATING A SIGHTING SYSTEM

FIELD OF THE INVENTION

The invention relates to a method for calibrating a sighting system to aim at an object using a viewfinder, the position of the object being located in a frame of reference external to the viewfinder, and a system implementing said method.

The invention finds application in particular in the field of the acquisition of high resolution images in a precise position, such as the acquisition of images of biometric traits of individuals.

STATE OF THE PRIOR ART

The calibration of a sighting system is the determination of a control law to apply to a viewfinder to make it possible, from a position of an object in a frame of reference external to the viewfinder, to orient said viewfinder so as to aim at the object.

An example of application is a system for acquiring images of biometric traits of individuals, such as for example iris images. In order to acquire high resolution images of the iris of an individual, the system requires a high resolution camera. Due to this important resolution, this camera cannot have a wide fixed field, but has to be movable in order to be able to aim at an iris of an individual.

The system thus also comprises two cameras of lower resolution, but wide field, and fixed, which can detect the position of an iris of an individual.

The position of the iris in the frame of reference of the wide field cameras has to be exploited by the high resolution camera in order to aim at the iris and then carry out its acquisition.

In this type of system, the determination of the control law of the sighting camera (in the preceding example: the high resolution camera) has been carried out from an a priori kinematic model of the system comprising all of the cameras.

This model makes it possible to estimate the relative positions of the different cameras of the system, and according to these positions, the position of the object in the frame of reference of the sighting camera, then the controls to apply to this camera to aim at the object.

However this approach has numerous problems. Firstly the determination of a kinematic model has to be implemented for each new sighting system, since the model depends on the relative positions between the different components of the system. Yet this process of determining the kinematic model is long and complex.

Furthermore, this approach may require, in order to simplify the kinematic model, simplifying the design of the sighting system, which can prove to be restrictive.

Finally, this approach is very restrictive with regard to mechanical precision during the manufacture of the sighting system in order to assure the relevance of the kinematic model once the sighting system is assembled.

Errors of precision may arise if the sighting system has not been assembled with the required precision and if discrepancies exist between the a priori model and the real system.

Another solution has been proposed in the article of Junejo, I. N, and Foroosh, H, *Optimizing PTZ camera calibration from two images*, Machine Vision and Applications, 23(2), 375-389; 2012.

Nevertheless this method requires acquiring two images with an overlap of views, thus with a big focal length, with a small angular difference between the shots, which is restrictive and unfavourable for precision.

The document US 2010/0289869 describes another type of calibration of a camera, comprising the determination of intrinsic and extrinsic parameters of a camera, the extrinsic parameters including particularly the sighting angles of the camera with respect to a point, from the controls of the camera to aim at the point.

This document does not make it possible to establish a control law to apply to the camera in order to attain these sighting angles. Furthermore, this document cannot be applied in the case of the acquisition of iris images because the long focal distance used for this purpose prevents determining with precision the intrinsic and extrinsic parameters of the camera.

DESCRIPTION OF THE INVENTION

The aim of the invention is to propose a method for calibrating a sighting system that is simple and rapid to implement, and less restrictive on the design and the manufacture of the sighting system.

The aim of the invention is also to propose a universal calibration method, that is to say not depending on the composition or the structure of the sighting system.

In this respect, the subject matter of the invention is a method for calibrating a sighting system comprising a viewfinder and an optic for detecting the position of an object in space, characterised in that it comprises the determination of a control law to apply to the viewfinder to aim at the object as a function of its position, said position being determined in a frame of reference of the detection optic and the control law comprising two angular controls and a focusing control of the viewfinder, expressed as a function of the relative positions between the object to aim at and an intersection point of all the lines of sight of the viewfinder, the method comprising the steps consisting in:
  aiming, with the viewfinder, at objects found at at least six different known positions in the frame of reference of the sighting system and noting the corresponding controls,
  from the positions of the object and the corresponding controls, determining the position of the intersection point of the lines of sight and the control law by the minimisation of a function of the second derivative of the control law.

Advantageously, but optionally, the method according to the invention may further comprise at least one of the following characteristics:
  the step of determining the position of the intersection point and the control law comprises the implementation of the steps consisting in:
    determining a position of the intersection point corresponding to controls minimising the function of the second derivative of the control law, and
    once the position of the intersection point is determined, determining the controls minimising the function of the second derivative of the control law.
  the step of determining the position of the intersection point comprises the minimisation, as a function of said position, of the integral of the sum of the second derivatives of the angular controls.
  the step of determining the position of the intersection point comprises the minimisation, as a function of said position, of the integral of the sum of the second derivatives of the relative angular positions between the point to aim at and the intersection point expressed as a function of the angular controls of the viewfinder.

each angular control is a function of two angles of thin plate spline type.

each angular control is a function of two angles of regularised thin plate spline type.

the determination of the focus control is implemented during the determination of the angular controls or after the determination of the angular controls and point M.

the determination of the focus control comprises the minimisation of the integral of the second derivative of the focus control.

the focus control is a function of cubic spline type.

The invention also relates to a sighting system comprising a viewfinder, an optic for detecting a position of an object to aim at, and a processing unit including processing means, the sighting system being characterised in that it is adapted to implement the method according to the preceding description.

Finally, the subject matter of the invention is the use of such a sighting system comprising the steps consisting in:

acquiring a position of an object to aim at in a frame of reference of the detection optic, deducing from the relative positions between the object and an intersection point of the lines of sight of the viewfinder, the coordinates of the object in a spherical frame of reference centred on the intersection point, and from the control law determined during the calibration, deducing a control to apply to the viewfinder to aim at the object.

The proposed calibration method has the advantage of being an automatic method and simple to implement by any sighting system.

This method does not necessitate elaborating an a priori kinematic model of the system, which makes it possible to reduce the mechanical reproducibility constraints of the system during manufacture and to reduce its cost. The constraints on the design of the system to simplify the kinematic model are also relaxed.

Furthermore, the proposed method does not require shots having an overlapping area.

DESCRIPTION OF THE FIGURES

Other characteristics, aims and advantages of the present invention will become clearer from reading the detailed description that follows, with regard to the appended figures, given as non-limiting examples and in which:

FIG. 1b represents a schematic two-dimensional view of an alternative embodiment of the sighting system of FIG. 1a.

DETAILED DESCRIPTION OF AT LEAST ONE EMBODIMENT OF THE INVENTION

Sighting System

Figure 1A:
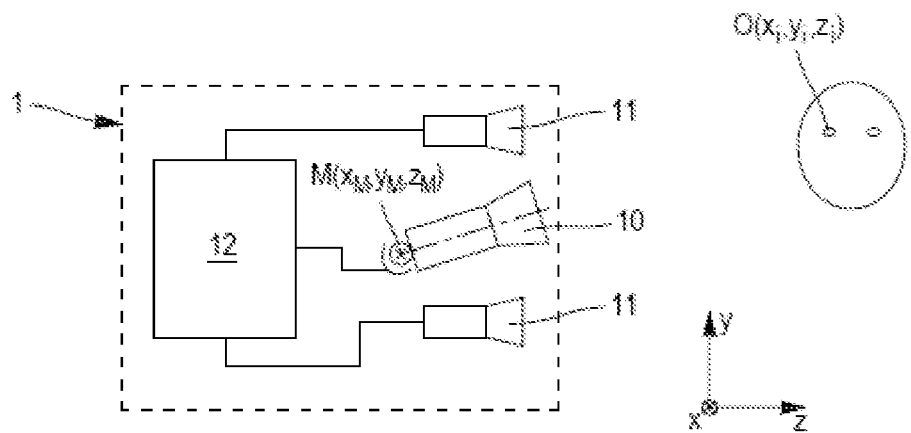
FIG. 1a represents a schematic two-dimensional view of a sighting system.

In FIG. 1a is represented an example of sighting system 1 being able to be calibrated according to the method described hereafter.

This sighting system 1 comprises at least one viewfinder 10, being able to be an image acquisition device such as a camera. The viewfinder 10 is rotationally movable along two axes which are the yaw and the pitch, the rotation of the viewfinder along these two axes being actuated by a motor, not represented.

The viewfinder 10 also has variable focusing to carry out focusing over a range of depths.

The sighting system 1 also comprises an optic 11 for detecting a position of an object O in space, for example in the form of two cameras. The position of the object O is located in the frame of reference of the detection optic 11, which is a different frame of reference to that of the viewfinder 10. This frame of reference is fixed arbitrarily, and may be, as the case may be, orthonormal.

$(x_i, y_i, z_i)$ designate the coordinates of the object O in the frame of reference of the detection optic.

Figure 1B:
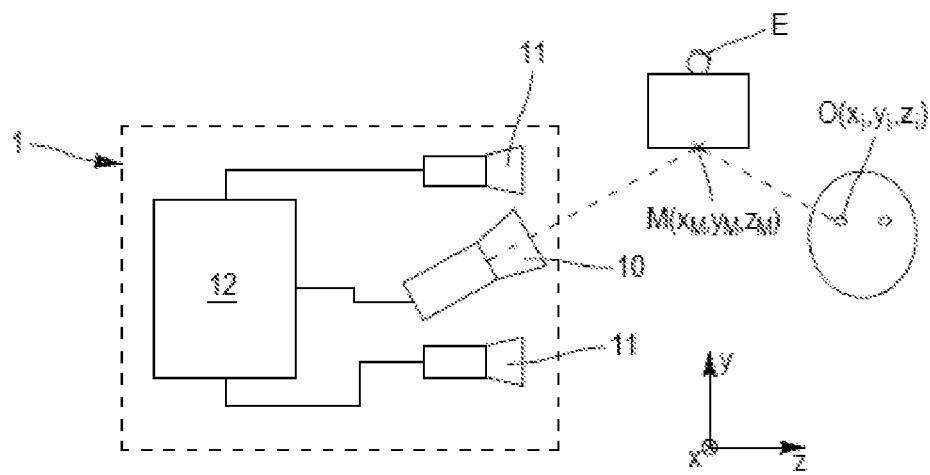

In FIGS. 1a and 1b is represented a non-limiting example of frame of reference. In this case, this frame of reference is orthogonal, has a z axis corresponding to a longitudinal sighting axis of the detection optic 11 and an x axis corresponding to the horizontal of the image obtained by this detection optic. This frame of reference is that which is used hereafter.

Finally the sighting system comprises a processing unit 12, for example an integrated circuit, comprising processing means adapted to control the rotation and the focusing of the viewfinder 10 by a control law from the position of the object detected by the detection optic 11.

In FIG. 1b, an alternative embodiment of the sighting system is represented, comprising a mirror 13 mounted between the object O to aim at and the sighting system, the mirror being rotationally movable along two axes. The viewfinder 10 is in this case fixed and aims at the mirror 13, and the rotation of the mirror makes it possible to move the line of sight of the viewfinder 10 to aim at the object O.

Hereafter, the hypothesis is made that in both cases there exists a point M at the intersection of all the lines of sight of the viewfinder 10. This point M corresponds to the intersection between the mirror 13 and the line of sight of the viewfinder 10 extending between the viewfinder and the mirror 13 in the case of FIG. 1b.

In FIG. 1a, by considering that the viewfinder 10 is mounted according to a perfect ball and socket joint, the centre of rotation of which is on the optical axis, point M corresponds to the centre of rotation.

Hereafter, the relative positions of the object O and point M are exploited, to deduce therefrom the control law of the viewfinder 10.

Figure 1C:
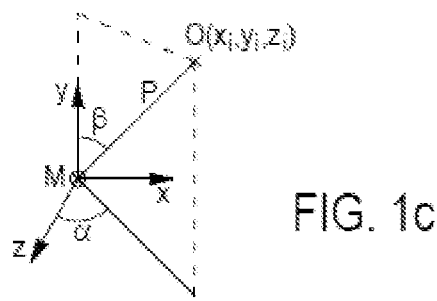
FIG. 1c represents an example of frame of reference for the measurement of the relative positions of a point to aim at and an intersection point of the lines of sight of the viewfinder of the sighting system.

In particular, since the positions of the object O and point M are located in the frame of reference of the detection optic 11, it is possible to convert the coordinates of the object O in this frame of reference into spherical coordinates with respect to point M. In FIG. 1c is represented the conversion of the coordinates of point O in the spherical frame of reference centred on point M.

The spherical coordinates of the object O comprise two values of angles $\alpha$ and $\beta$ and a distance value.

According to the preceding example in which the frame of reference of the detection optic 11 is an orthonormal frame of reference, while noting $x_M$, $y_M$ and $z_M$ the coordinates of the intersection point M in the frame of reference of the detection optic 11, the coordinates $\alpha_i$ and $\beta_i$ of the object O being written as follows:

$$\alpha_i = \tan^{-1}\left(\frac{x_i - x_M}{z_i - z_M}\right)$$

$$\beta_i = \cos^{-1}\left(\frac{y_i - y_M}{\|0 - M\|}\right)$$

Where $\|0-M\|$ is the distance between point O and point M, noted $\rho$ hereafter.

Calibration Method

Figure 2A:
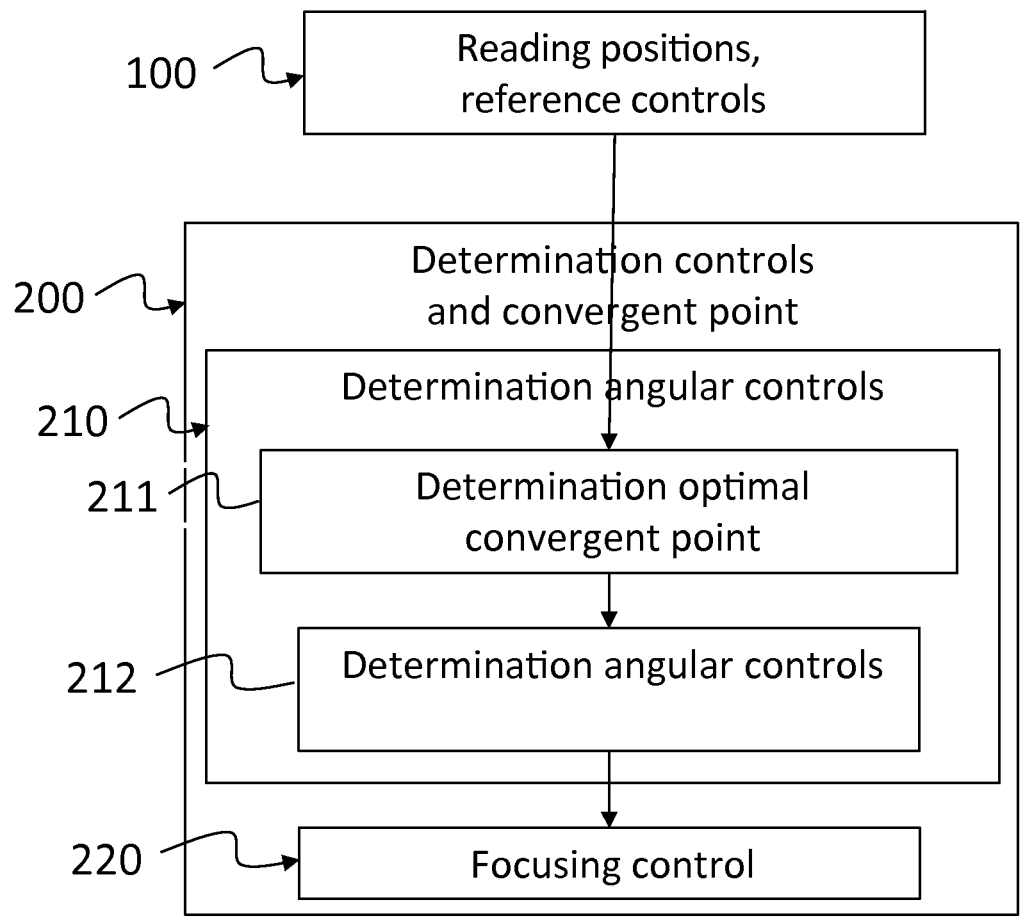
FIGS. 2a and 2b schematically represent the main steps of a method for calibrating the sighting system according to two embodiments.
Figure 2B:
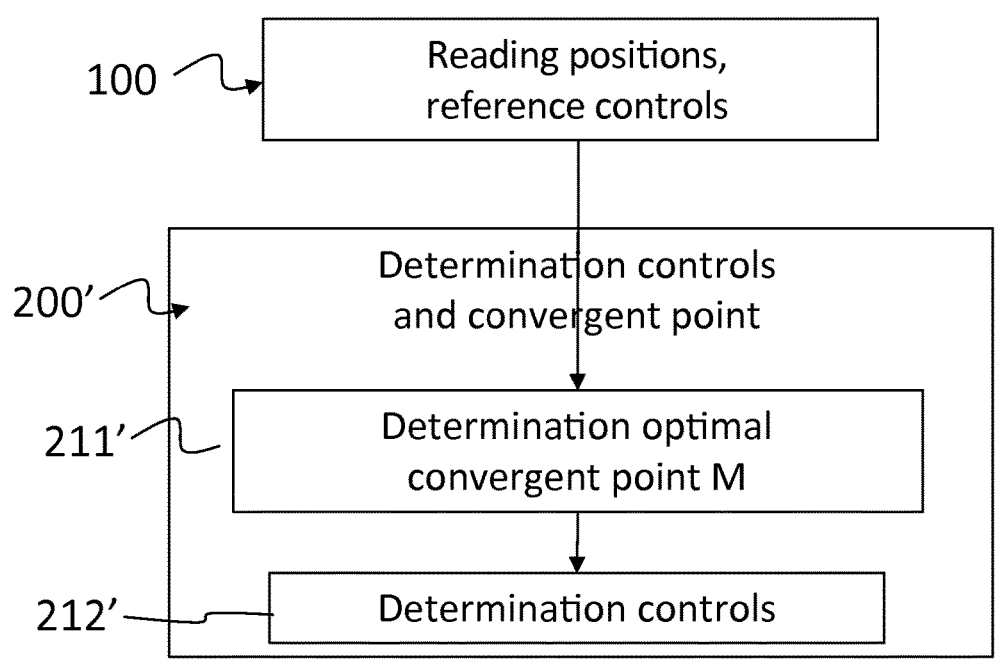

The calibration method, of which the main steps are represented in FIGS. 2a and 2b, comprises the determination of a control law $\{C_y, C_p, C_d\}$ to apply to the viewfinder to aim at an object O, and the determination of the position of the intersection point of the lines of sight M.

This method is implemented by the sighting system 1, in particular step 200 is implemented by the processing means of the processing unit, by running a suitable programme.

The control law comprises two angular controls $C_y$, $C_p$, these controls being controls for rotating the viewfinder respectively in yaw and in pitch to apply to the viewfinder to be oriented towards the object O.

The two angular controls are determined as a function of the position of the object O to aim at with respect to point M. They are thus a function of the angles $\alpha$ and $\beta$: $C_y(\alpha,\beta)$, $C_p(\alpha, \beta)$, $\alpha$ and $\beta$ themselves depending on the position of point M.

The control law also comprises a control for focusing $C_d(\rho)$ the viewfinder as a function of the distance p between the intersection point of the lines of sight M and the object O, $\rho$ itself depending on the position of point M.

The control law is noted $C=\{C_y(\alpha,\beta), C_p(\alpha,\beta), C_d(\rho)\}$ The method comprises a first step of acquisition 100 of n reference positions of objects aimed at and the corresponding controls to apply to the viewfinder to aim at the positions, n being a whole number greater than or equal to 6. $P_i$ designates the reference positions acquired during this step, $C_{yi}$, $C_{pi}$ the corresponding angular controls and $C_{di}$ the corresponding focusing controls.

This step 100 is advantageously implemented by means of a test pattern equipped with several bar codes, and positioned in at least two different positions.

The viewfinder 10 may be manually controlled to be positioned so as to successively acquire a sharp image of each of the bar codes of the test pattern (this corresponds both to an aiming precision and a focusing precision).

Alternatively, the viewfinder may acquire images of the test pattern without being controlled to specifically aim at a bar code, and the aimed at position is determined a posteriori as a function of what appears on the image, advantageously by reading a bar code appearing on the image.

Advantageously, the test pattern comprises at least ten, or even twenty bar codes, which correspond to as many positions $P_i$, and the test pattern is itself positioned in several places with respect to the viewfinder to multiply the number of positions $P_i$.

Each position $P_i$ is acquired in the frame of reference of the detection optic 11.

Once a bar code of the test pattern is correctly aimed at, the corresponding angular $C_{yi}$, $C_{pi}$ and focusing $C_{di}$ controls of the viewfinder 10 are noted.

Then the method comprises a step 200 of determining the position of the intersection point M and the controls $C_y$, $C_p$, $C_d$ composing the control law.

This step is implemented by determining the minimum of a function of the second derivative of the control law. In this way the controls obtained are the least chaotic for a fixed position of the object O, thus the most robust in the event of imprecision on the measurement of the position of the object O.

The function to minimise, which may be named energy of deformation of the control law, is the integral of the sum of the second derivatives of the controls composing the control law.

It is written as follows:

$$f = \int\int \left\|\frac{d^2C_y}{d\alpha^2}\right\|^2 + 2\left\|\frac{d^2C_y}{d\alpha d\beta}\right\|^2 + \left\|\frac{d^2C_y}{d\beta^2}\right\|^2 d\alpha d\beta +$$

$$\int\int \left\|\frac{d^2C_p}{d\alpha^2}\right\|^2 + 2\left\|\frac{d^2C_p}{d\alpha d\beta}\right\|^2 + \left\|\frac{d^2C_p}{d\beta^2}\right\|^2 d\alpha d\beta + k\int \left\|\frac{d^2C_d}{d\rho^2}\right\| d\rho$$

Where k is a predetermined weighting constant, for example equal to 1.

According to a first embodiment represented in FIG. 2a, this step is implemented by firstly determining, during a sub-step 210, the angular controls $C_y$, $C_p$, then secondly the focus control $C_d$.

This step 210 is implemented by determining in an iterative manner 211 the optimal position of point M corresponding to the controls $C_y$, $C_p$ minimising the function f, then by determining 212 the angular controls minimising said function once point M is determined at the end of step 211.

Step 211 of determining the optimal position of point M may be implemented in different ways.

According to a first possibility, f* designates the term of f corresponding uniquely to the angular controls (f deprived of its term function of the focus control $C_d$).

$$f^* = \int\int \left\|\frac{d^2C_y}{d\alpha^2}\right\|^2 + 2\left\|\frac{d^2C_y}{d\alpha d\beta}\right\|^2 + \left\|\frac{d^2C_y}{d\beta}\right\|^2 d\alpha d\beta +$$

$$\int\int \left\|\frac{d^2C_p}{d\alpha^2}\right\|^2 + 2\left\|\frac{d^2C_p}{d\alpha d\beta}\right\|^2 + \left\|\frac{d^2C_p}{d\beta^2}\right\|^2 d\alpha d\beta$$

Given f* it is known how to determine $\text{argmin}_{C_y,C_p}(f^*(M, C_y,C_p))$ at fixed M (obtaining controls minimising f* is described hereafter at step 212, which describes this step for the particular case of optimal M), that is to say that it is known how to calculate the functions $C_y$ and $C_p$ minimising the function f*.

F* designates the function of $R^3$ in R defined as follows:

$$F^*(M)=\min_{C_y,C_p}(f^*(M,C_y,C_p))$$

Step 211 of determining the optimal position of point M is a step of minimising the function F* (resp. G*). This step may be implemented by gradient descent.

It is implemented in an iterative manner as follows:
Determination of a position of point M,
Calculation of $C_y$, $C_p$ minimising f* at fixed M,
Iterative adjustment of the value of point M to determine new $C_y$, $C_p$ minimising f*.

According to a second possibility, it is possible to inverse the calculation by expressing the angles $\alpha$ and $\beta$ as a function of the controls $C_y$, $C_p$ and not the inverse. The function g* is obtained such that:

$$g^* = \int\int \left\|\frac{d^2\alpha}{dC_y^2}\right\|^2 + 2\left\|\frac{d^2\alpha}{dC_y dC_p}\right\|^2 + \left\|\frac{d^2\alpha}{dC_p^2}\right\|^2 dC_y dC_p +$$

-continued $$\int\int\left\|\frac{d^2\beta}{dC_y^2}\right\|^2+2\left\|\frac{d^2\beta}{dC_ydC_p}\right\|^2+\left\|\frac{d^2\beta}{dC_p^2}\right\|^2dC_ydC_p$$

In this case, step 211 comprises the determination of the position of point M minimising the function G*, defined from $R^3$ in R as follows:

$$G^*(M)=\min_{\alpha,\beta}(g^*(M,\alpha,\beta))$$

This step is implemented iteratively by calculating, for example by gradient descent, for each position of point M, the angles $\alpha$ and $\beta$ expressed as a function of the controls $C_y$, $C_p$ minimising the function $g^*$, then by adjusting the position of point M.

At the end of step 211, whatever the variant implemented, an optimal position of point M is thereby obtained.

It is then possible to determine during a step 212 the angular controls $C_y$, $C_p$ minimising f* for this position of point M.

The minimisation of this term is carried out by taking account of the constraints which result from step 100, according to which:

$$C_y(\alpha(P_i-M),\beta(P_i-M))=C_{yi}$$

$$C_p(\alpha(P_i-M),\beta(P_i-M))=C_{pi}$$

for i=1, ..., n where n is the number of reference positions noted during step 100.

According to the article of F. L. Bookstein, *Principal Warps: Thin-Plate Splines and the Decomposition of Deformations*, IEEE Transactions on Pattern Analysis and Machine Intelligence Vol. 11, No 6, June 1989, the angular controls minimising the function f* at fixed M are of the TPS (Thin Plate Spline) type.

The angular control $C_y$ (resp. $C_p$) is written as follows:

$$C_y(\alpha,\beta)=a_1+a_\alpha\alpha+a_\beta\beta+\sum_{i=1}^n w_iU(\|(\alpha(P_i-M),\beta(P_i-M))-(\alpha,\beta)\|)$$

With:

$$U(r)=r^2\log(r^2)$$

The points $P_i$ correspond to the n points obtained at step 100, and to which correspond respective angle values $\alpha_i$, $\beta_i$. The fact of having at least 6 points $P_i$ makes it possible to obtain at least as many known points as degrees of freedom (3 degrees of freedom for $a_1$, $a_\alpha$ and $a_\beta$ and three others for the position of point M).

The matrices are defined as follows:

$$K=\begin{bmatrix} 0 & U(\|(\alpha_1,\beta_1)-(\alpha_2,\beta_2)\|) & \cdots & U(\|(\alpha_1,\beta_1)-(\alpha_n,\beta_n)\|) \\ U(\|(\alpha_2,\beta_2)-(\alpha_1,\beta_1)\|) & 0 & \cdots & U(\|(\alpha_2,\beta_2)-(\alpha_n,\beta_n)\|) \\ \cdots & \cdots & \cdots & \cdots \\ U(\|(\alpha_n,\beta_n)-(\alpha_1,\beta_1)\|) & U(\|(\alpha_n,\beta_n)-(\alpha_2,\beta_2)\|) & \cdots & 0 \end{bmatrix}, n\times n$$

where $|P_i-P_j|$ is the distance between the points $P_i$ and $P_j$.

$$Q=\begin{bmatrix} 1 & \alpha_1 & \beta_1 \\ 1 & \alpha_2 & \beta_2 \\ \cdots & \cdots & \cdots \\ 1 & \alpha_n & \beta_n \end{bmatrix}, n\times 3$$

and $$L=\begin{bmatrix} K & Q \\ Q^T & O \end{bmatrix}, (n+3)\times(n+3)$$

Where QT is the transpose of a Q and O is a 3×3 zero matrix.

Let $V=(v_1, \ldots, v_n)$ a vector of length n corresponding to the controls $C_{yi}$ (resp. $C_{pi}$) acquired during step 100, and $Y=(V|0\ 0\ 0)$ a column vector of dimension n. The vector $W=(w_1, \ldots, w_n)$ and the coefficients $a_1$, $a_\alpha$, and $a_\beta$ are supplied by the equation:

$$L^{-1}Y=(W|a_1a_\alpha a_\beta)^T.$$

Advantageously, but optionally the angular controls $C_y$, $C_p$ may be functions of regularised thin plate spline type, as described in the publication of G. Donato and S. Belongie, *Approximate Thin Plate Spline Mappings*, Computer Vision—ECCV 2002, Springer Berlin Heldelberg, 2002, 21-31.

The use of regularised splines makes it possible to relax the constraint on the angular controls at the level of the reference points $P_i$ aimed at during step 100 (the obtained controls do not take exactly the values $C_{yi}$ and $C_{pi}$ if the object is found at position $P_i$) and thus to take account of potential measuring noise. This makes it possible to obtain a more robust control law.

In practice, according to an advantageous embodiment, during step 100, the controls $C_y$ and $C_p$ are not controls exactly minimising the function f*, but approaching the minimum. The minimised function is thus not f* but a function $f_r$ defined as the sum of f* and residual errors:

$$f_r=f^*+\lambda\Sigma(C_y(\alpha(P_i-M),\beta(P_i-M))-C_{yi})^2+(C_p(\alpha(P_i-M),\beta(P_i-M))-C_{pi})^2$$

where $\lambda$ is a pre-determined constant, for example equal to 1.

The expressions of $C_y$ and $C_p$ obtained during the minimisation of the function $f_r$ are identical to those obtained for the minimisation of f*, but with different values for $a_1$, $a_\alpha$ and $a_\beta$ and $w_i$.

Returning to FIG. 2a, the method also comprises a step 220 of determining the focus control $C_d$.

This step comprises the minimisation of the function f comprising the term linked to the focus control, noted $f_d$ (f=f*+$f_d$), while having M, $C_y$ and $C_p$ fixed. In a variant, only the term $f_d$ linked to the focus control is minimised, this variant being equivalent because f* does not depend on the focusing control $C_d$. The document of D. Eberly, *Thin-Plate Splines*, Geometric Tools LLC, on the site www.geometrictools.com teaches the solution for the minimisation of the function $f_d$.

The focus control $C_d$ obtained is a cubic spline, which is written as follows:

$$Cd = a_1 + a_\rho \rho + \sum_{i=1}^{n} w_i U_{1D}(|\rho - \rho(P_i - M)|)$$

with $U_{1D}(r)=r^3$, and the constraint which results from step 100, according to which:

$$C_d(\rho(P_i-M))=C_{d_i}$$

The calculations of the coefficients $a_1$, $a_\rho$ and $w_i$ take place in a manner analogous to the preceding description concerning the calculation of regularised thin plate splines: definition of the matrices K, Q and L and obtaining coefficients from the matrix L and a vector V comprising the focusing controls $C_{di}$ corresponding to the known positions $P_i$.

According to an alternative embodiment represented in FIG. 2b, during step 200, the angular and focusing controls are calculated simultaneously.

In this case 200' designates the step of determining the control, this step also being an iterative step comprising the implementation, successively, of a first sub-step 211' in which the optimal position of point M is determined, by determining the controls $C_y$, $C_p$, $C_d$ minimising the function f at each fixed M, and a second sub-step 212' during which the controls $C_y$, $C_p$ and $C_d$ are determined at the fixed optimal point M resulting from step 211'.

Figure 3:
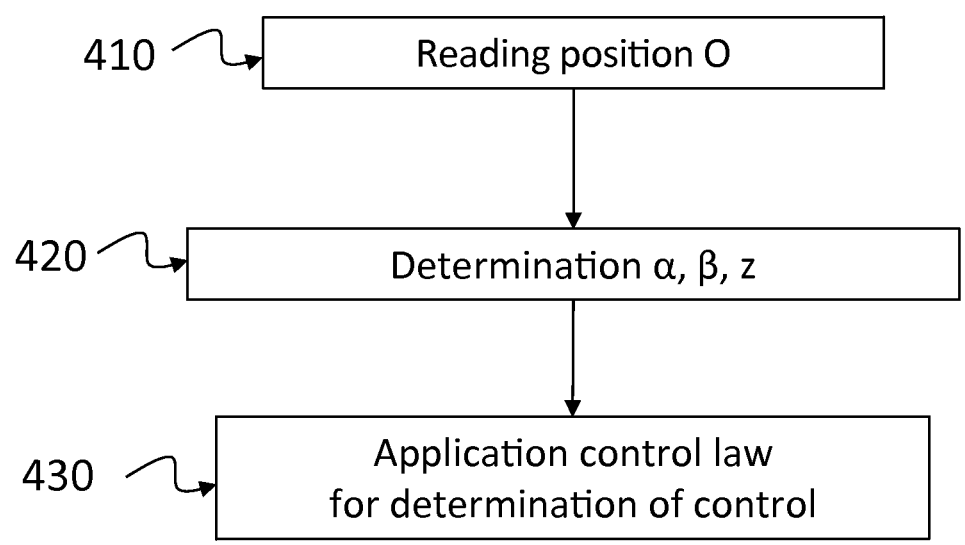
FIG. 3 schematically represents the steps of using a sighting system calibrated according to the method of FIG. 2a or 2b.

Once the control law is determined, the sighting system is used as follows, and as illustrated in FIG. 3:

The position of an object O in the frame of reference of the detection optic 11 is determined during a step 410.

From the position of the object O and the position of point M, determined during the calibration method, one deduces 420 therefrom the values of the angles α and β and the distance d between the object O and point M.

Then, the control law determined during the calibration method makes it possible to deduce 430 therefrom the controls to apply to the motor and to the viewfinder to aim at the object O accurately.

The proposed method has the advantage of being able to be implemented on any sighting system without a priori knowledge of its kinematic model. It thus does not lead to constraints on the design or the use of the system.

The method has a preferred application within the scope of the acquisition of iris images at a distance. In this case, the sighting system 1 comprises, as viewfinder 10, a movable camera with narrow field and high resolution, for example a resolution of the order of 200 dpi at one meter.

The detection optic 11 comprises two fixed cameras with resolution relatively lower than the viewfinder, for example of the order of 30 dpi at one meter, and with field relatively wider than the viewfinder, in order to be able to locate in a scene an iris of an individual of which it is desired to acquire an image.

The position of the iris is acquired by the detection optic and communicated to the viewfinder which, having been calibrated using the aforementioned method, can position itself to accurately aim at the iris and to acquire therefrom an image.

This method also makes it possible to aim at an object such as an iris in a scene even if its position is not known a priori. This is thus less restrictive for users of which the iris image is acquired because in this way they do not have to position themselves in a particular manner or at a precise spot so that an image of their iris can be acquired.

The method is not nevertheless limited to the field of the acquisition of images of biometric traits but is applicable to any object that it is wished to aim at by a sighting system.

The invention claimed is:

1. A method for calibrating a sighting system, said sighting system comprising a viewfinder focusable and rotationally movable along two axes, a detection optic for detecting a position of an object in a frame of reference of the detection optic, and a processing unit including a processor to control the rotational movement and focus of said viewfinder, said method comprising:

by operation of a motor which rotates said viewfinder along said two axes, pointing and focusing said viewfinder at reference objects located at at least six different known reference positions in the frame of reference of the detection optic and storing values representing corresponding angular and focusing controls applied to the viewfinder to complete said pointing and focusing, from the known reference positions of the reference objects and the stored values, determining an intersection point of all lines of sight of the viewfinder, and determining a control law including two angular controls and a focusing control to apply to the viewfinder to aim at an object as a function of the position of said object, wherein the two angular controls are functions of the relative positions of the object and the intersection point, and wherein said focusing control is a function of a distance between the intersection point and the object, wherein said control law is determined by the minimisation of a function of the second derivative of the control law, calibrating the sighting system by configuring the processing unit to determine from said control law the two angular control values and the focusing control value to apply for the viewfinder to be aimed at and focused on an object based on a position of said object in a frame of reference of the detection optic.

2. The method for calibrating a sighting system according to claim 1, in which the step of determining the position of the intersection point and the control law comprises iteratively:

determining a position of the intersection point corresponding to the two angular controls minimising the function of the second derivative of the control law, and once the position of the intersection point is determined, determining the two angular controls minimising the function of the second derivative of the control law.

3. The method for calibrating a sighting system according to claim 2, in which the step of determining the position of the intersection point comprises the minimisation, as a function of said position, of the integral of the sum of the second derivatives of the angular controls.

4. The method for calibrating a sighting system according to claim 2, in which the step of determining the position of the intersection point comprises the minimisation, as a function of said position, of the integral of the sum of the second derivatives of the relative angular positions between the reference object and the intersection point expressed as a function of the angular controls of the viewfinder.

5. The method for calibrating a sighting system according claim 1, in which each angular control is a function of two angles of thin plate spline type.

6. The method for calibrating a sighting system according to claim 5, in which each angular control is a function of two angles of regularised thin plate spline type.

7. The method for calibrating a sighting system according to claim 2, in which the determination of the focus control is implemented during the determination of the angular controls or after the determination of the angular controls and the intersection point.

8. The method for calibrating a sighting system according to claim 7, in which the determination of the focus control comprises the minimisation of the integral of the second derivative of the focus control.

9. The method for calibrating a sighting system according to claim 1, in which the focus control is a function of cubic spline type.

10. A sighting system, comprising:
  a viewfinder;
  a detection optic for detecting a position of an object to aim at; and
  a processing unit including a processor configured to perform the method according to claim 1, so as to configure said processing unit to determine from the control law the two angular control values and the focusing control value to apply for the viewfinder to aim at and focus on an object based on a position of said object in a frame of reference of the detection optic.

* * * * *